(12) United States Patent
Yu et al.

(10) Patent No.: US 8,753,032 B2
(45) Date of Patent: Jun. 17, 2014

(54) FRICTION CONTROLLED BALL JOINT

(75) Inventors: Jinghong Yu, Dublin, OH (US); David Wolf, Marysville, OH (US); Daniel Vogel, Columbus, OH (US); Edward A. Hosni, Galloway, OH (US); Angel D. Samalot-Quiles, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 320 days.

(21) Appl. No.: 12/607,095

(22) Filed: Oct. 28, 2009

(65) Prior Publication Data

US 2011/0097140 A1 Apr. 28, 2011

(51) Int. Cl.
*F16C 11/06* (2006.01)
*F16C 11/08* (2006.01)

(52) U.S. Cl.
CPC ......... *F16C 11/0647* (2013.01); *F16C 11/0652* (2013.01)
USPC ......... 403/137; 403/90; 403/145; 280/93.511

(58) Field of Classification Search
CPC ............. F16C 11/0652; F16C 11/0647; F16C 11/0642; F16C 11/0666; F16C 11/08; F16C 11/083; F16C 11/086
USPC ........... 403/90, 114, 115, 135, 137, 145, 132, 403/147, 148, 110, 133, 136, 138, 141, 142, 403/143, 144, 124–128; 280/93.511; 285/268, 269
See application file for complete search history.

(56) References Cited

U.S. PATENT DOCUMENTS

| | | | | |
|---|---|---|---|---|
| 807,857 | A | * | 12/1905 | Palmenberg ................. 403/148 |
| 859,426 | A | * | 7/1907 | Betz ............................... 285/269 |
| 1,651,522 | A | * | 12/1927 | Gold ............................... 285/267 |
| 1,669,949 | A | * | 5/1928 | Reynolds ...................... 285/268 |
| 1,918,394 | A | * | 7/1933 | Hufferd et al. ................... 403/75 |
| 1,991,363 | A | * | 2/1935 | La Hodny et al. ............. 403/148 |
| 3,574,369 | A | * | 4/1971 | Andrew ......................... 403/132 |
| 3,958,904 | A | * | 5/1976 | Rusbach .......................... 403/90 |
| 4,063,834 | A | * | 12/1977 | Hanson et al. ................. 403/138 |
| 4,070,121 | A | | 1/1978 | Graham |
| 4,159,186 | A | | 6/1979 | Funcke |
| 4,187,033 | A | * | 2/1980 | Zukowski ..................... 403/137 |
| 4,447,139 | A | * | 5/1984 | Biber ............................ 359/384 |
| 4,537,524 | A | | 8/1985 | Hanson |
| 4,795,118 | A | * | 1/1989 | Kosugi et al. .............. 248/181.1 |
| 4,974,802 | A | * | 12/1990 | Hendren ..................... 248/181.1 |
| 4,986,689 | A | * | 1/1991 | Drutchas ....................... 403/127 |
| 5,052,844 | A | | 10/1991 | Kendall |
| 5,704,727 | A | | 1/1998 | Atkins et al. |
| 5,806,821 | A | * | 9/1998 | Phillips et al. ........... 248/288.51 |
| 5,816,731 | A | * | 10/1998 | Howard ........................ 403/145 |
| 5,904,436 | A | * | 5/1999 | Maughan et al. ............. 403/140 |
| 6,346,025 | B1 | * | 2/2002 | Tachau et al. .................... 446/71 |
| 6,352,228 | B1 | * | 3/2002 | Buerklin ..................... 248/181.1 |
| 6,379,073 | B1 | * | 4/2002 | Yoo et al. ........................ 403/90 |

(Continued)

*Primary Examiner* — Daniel P Stodola
*Assistant Examiner* — Matthew R McMahon
(74) *Attorney, Agent, or Firm* — Gregory J. Burke; Emerson Thomson Bennett, LLC

(57) ABSTRACT

A ball joint assembly may include a housing having a cavity, a friction seat received within the cavity, and a ball stud having a ball that frictionally contacts the friction seat. In one embodiment, a friction control mechanism moves the friction seat within the cavity to adjust the friction between the ball and the friction seat. In another embodiment, both the cavity and an outer surface of the friction seat may be substantially frustoconically shaped.

10 Claims, 7 Drawing Sheets

(56) References Cited

U.S. PATENT DOCUMENTS

| | | | |
|---|---|---|---|
| 6,422,779 B1 * | 7/2002 | Spagnuolo | 403/138 |
| 6,505,990 B1 * | 1/2003 | Maughan | 403/135 |
| 6,533,490 B2 | 3/2003 | Kincaid et al. | |
| 6,641,323 B2 * | 11/2003 | Ronsheim | 403/90 |
| 7,048,461 B2 | 5/2006 | Williams | |
| 7,300,028 B2 * | 11/2007 | Vogt | 403/125 |
| 7,464,906 B2 | 12/2008 | Temperato et al. | |
| 7,476,050 B2 | 1/2009 | Ditzler | |
| 7,537,407 B2 | 5/2009 | Shima | |
| 7,644,500 B2 * | 1/2010 | Schmidt et al. | 29/898.044 |
| 8,021,060 B2 * | 9/2011 | Sudhana et al. | 396/428 |
| 2004/0089784 A1 * | 5/2004 | Garrido | 248/424 |
| 2008/0193207 A1 * | 8/2008 | Kruse et al. | 403/133 |
| 2009/0087253 A1 * | 4/2009 | Spratte et al. | 403/131 |
| 2009/0103974 A1 | 4/2009 | Dendis et al. | |
| 2009/0232590 A1 * | 9/2009 | Ersoy et al. | 403/135 |

* cited by examiner

FRICTION CONTROLLED BALL JOINT

I. BACKGROUND

A. Field of Invention

This invention relates to the art of ball joints and more specifically to methods and apparatuses related to a friction controlled ball joint.

B. Description of the Related Art

It is well known to use ball joints in widely varied mechanical applications including automotive chassis systems, aircraft landing gear systems, and agricultural machinery. The fundamental function of a ball joint is to connect two mechanical parts together while allowing relative rotational movement of the parts. Friction exists in ball joints due to the inherent mechanical interference. Excessive friction is a disadvantage in that it negatively influences the dynamic behavior of the mechanical system. Moreover, mechanical friction of known ball joints degrades with time and, often of more concern, causes a significant variation in the dynamics of the system. Sometimes, however, friction in ball joints can be a positive characteristic helpful for damping the relative motion of the parts and/or adding resistance for the relative motion.

FIG. 7 illustrates a conventional ball joint assembly 200. The ball joint assembly 200 includes a housing 202 having a seat 204 that receives a ball stud 206. The ball stud 206 includes a ball 208 and a shank 210. A plug 212 holds the seat 204 within the housing 202 and a clip 214 holds a dust boot 216 to the housing 202. Friction occurs between an outer surface 218 of the ball 208 and an inner surface 220 of the seat 204. This friction is fixed and uncontrollable after the ball joint assembly 200 has been put together.

What is needed is a ball joint assembly that permits the friction between the ball and the seat to be controlled.

II. SUMMARY

According to one embodiment of this invention, a ball joint assembly includes: a housing having a cavity, wherein at least a first portion of the cavity has a substantially frustoconical shape; a first friction seat having an outer surface and an inner surface, wherein at least a portion of the outer surface has a substantially frustoconical shape that is received within the first portion of the cavity; a ball stud comprising: a ball like portion having an outer surface; and, a shank portion that extends out from the cavity, wherein a first portion of the outer surface of the ball like portion contacts the inner surface of the first friction seat; and, a friction control mechanism that moves the first friction seat within the first portion of the cavity to adjust the friction between the ball like portion and the first friction seat.

According to another embodiment of this invention, a method includes the steps of: (A) providing a ball joint assembly comprising: (1) a housing having a cavity; (2) a first friction seat having an outer surface and an inner surface, wherein at least a portion of the outer surface is received within the cavity; and, (3) a ball stud comprising: a ball like portion having an outer surface; and, a shank portion that extends out from the cavity, wherein a first portion of the outer surface of the ball like portion contacts the inner surface of the first friction seat; and, (B) adjusting the friction between the ball like portion and the first friction seat in both a first direction and a second direction that is offset 90 degrees from the first direction by moving the first friction seat within the first portion of the cavity.

According to yet another embodiment of this invention, a ball joint assembly includes: a housing having a cavity that is at least partially defined by a first inner surface; a friction seat that: (1) is at least partially received within the cavity; and, (2) has: (a) an outer surface juxtaposed to the first inner surface of the housing; and, (b) an inner surface; a ball stud having: (1) a ball like portion that: (a) is movable within the cavity; and, (b) has a first outer surface that contacts the inner surface of the friction seat; and, (2) a shank portion that extends out from the cavity; and, a friction control mechanism comprising: (1) a contact member positioned within the housing; (2) a controller that provides at least one of a mechanical and an electrical signal; (3) a motor that rotates a motor shaft in response to the signal from the controller; and, (4) a motion conversion device that converts rotational motion of the motor shaft into linear movement of the contact member to contact the friction seat to adjust the friction between the ball like portion and the friction seat.

One advantage of this invention is that the friction in a ball joint may be controlled.

Another advantage of this invention is that the friction in a ball joint may be controlled in different directions.

Another advantage of this invention is that the friction controlled ball joint may be easily manufactured.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
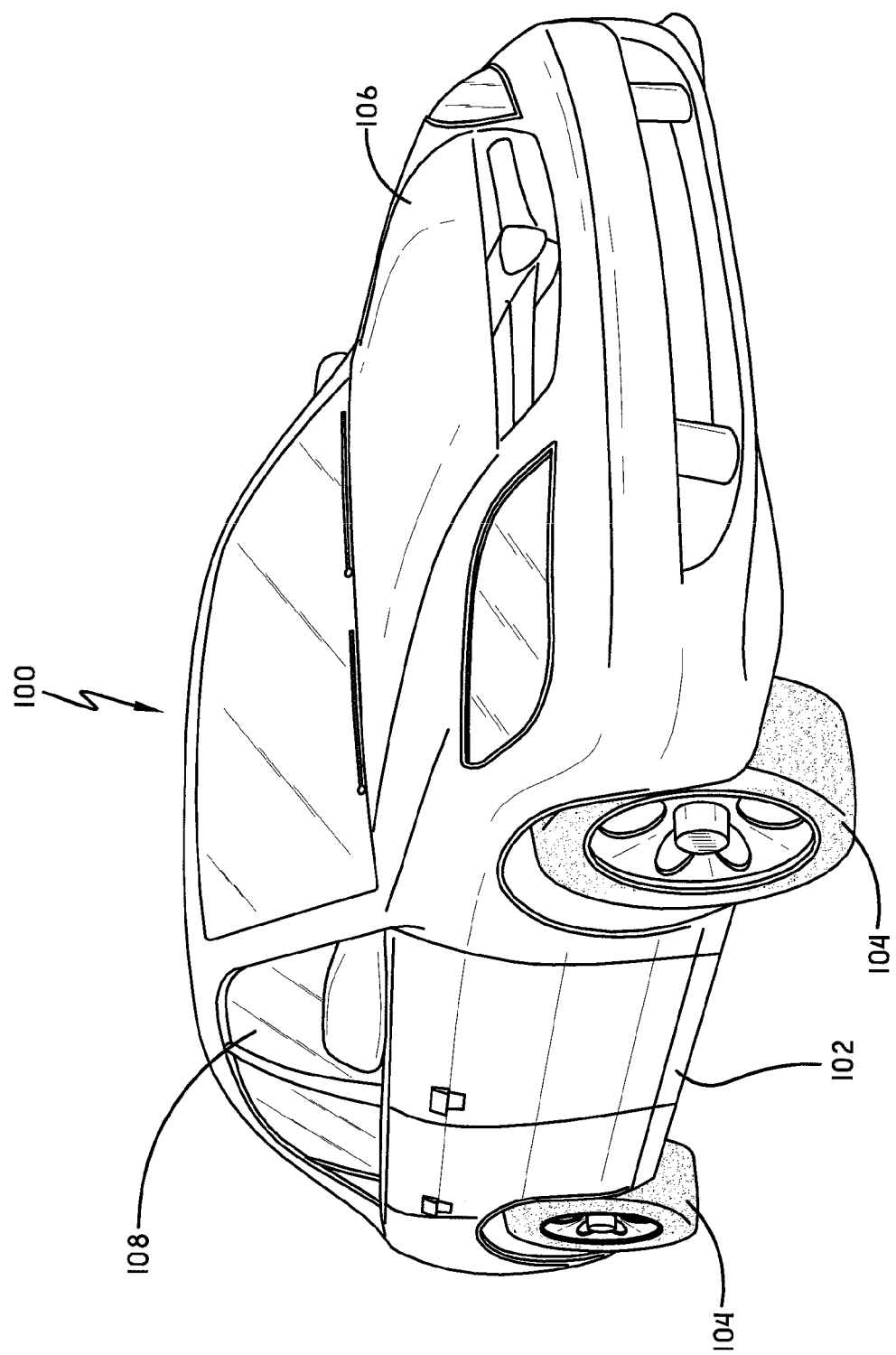
FIG. 1 is a front perspective view of a sedan.

Referring now to the drawings wherein the showings are for purposes of illustrating embodiments of the invention only and not for purposes of limiting the same, and wherein like reference numerals are understood to refer to like components, FIG. 1 shows a vehicle 100 that may be equipped with one or more ball joint assemblies 50 used in a chassis system 150 according to this invention. However, it should be noted that this is an exemplary use only as this invention is not limited to uses with chassis systems or with vehicles. While the vehicle 100 shown is a sedan, it is to be understood that the ball joint assembly 50 of this invention may be used with any vehicle chosen with the sound judgment of a person of skill in the art including, for some non-limiting examples, cars, sports utility vehicles (SUVs), trucks, motorcycles, aircraft and agricultural machinery. The vehicle 100 may include a frame 102, one or more ground engaging wheels 104 mounted to the frame 102, and a locomotion source 106, such as an engine or motor, mounted to the frame 102, for use in providing locomotion for the vehicle 100. The vehicle 100 may also have a passenger compartment 108 supported to the frame 102 which houses one or more passengers as is well known in the art.

Figure 2:
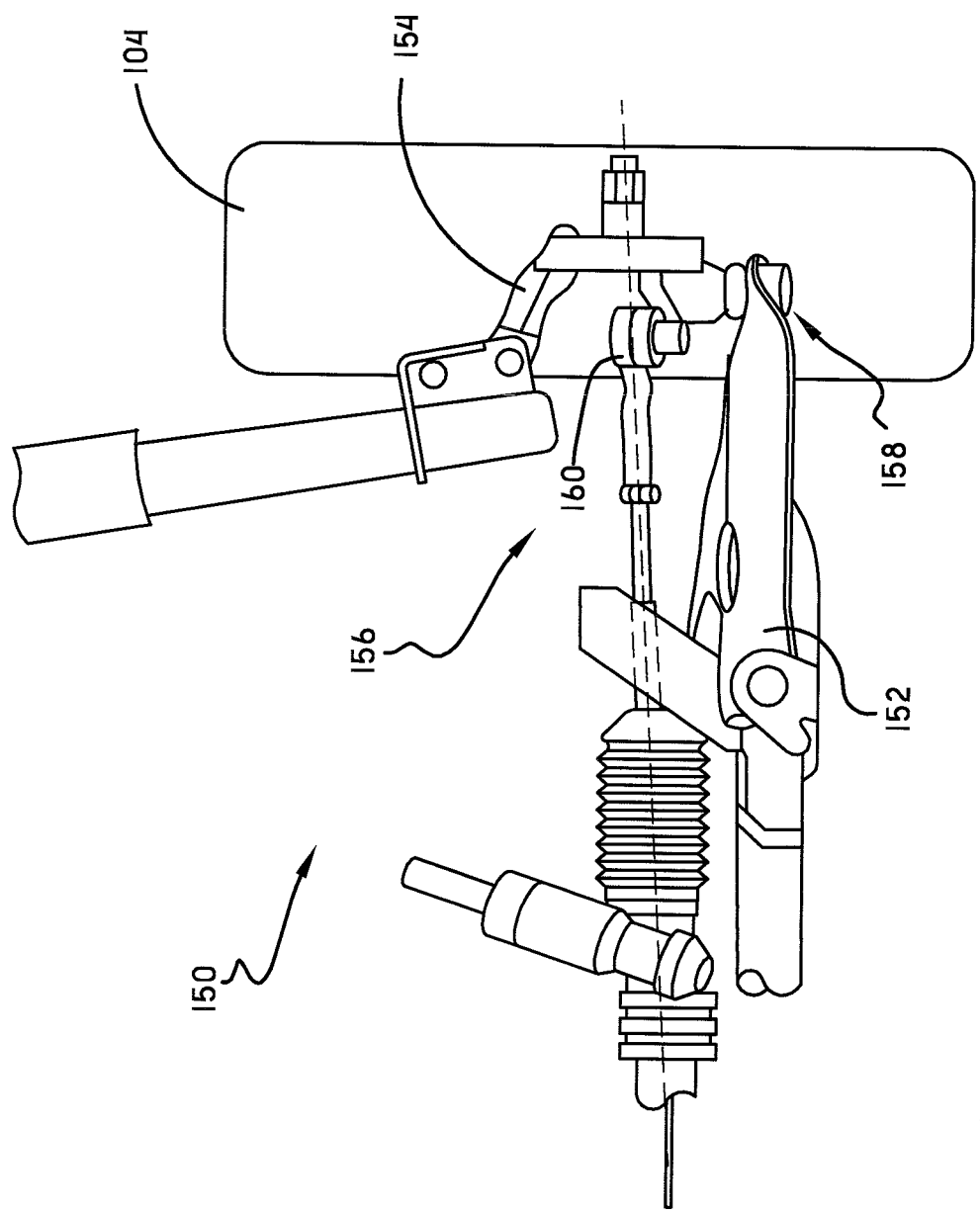
FIG. 2 is a fragmentary side view of an automotive chassis system.

With reference now to FIGS. 1-2, the chassis system 150, used in conjunction with a steerable wheel of the ground engaging wheels 104, may include a lower control arm 152 that is pivotally connected to a steering knuckle 154 by a ball joint assembly 158. Steering knuckle 154 may be pivotally coupled to a tie rod assembly 156 via another ball joint assembly 160. As the operation of a chassis system is well known to those of skill in the art, further details will not be provided here. However, it should be noted that one or both of the ball joint assemblies 158, 160 may be a ball joint assembly 50 as will be described further below. Also, as noted above, the use of a ball joint assembly 50 with a chassis system is only one example of the many potential uses of this invention.

Figure 3:
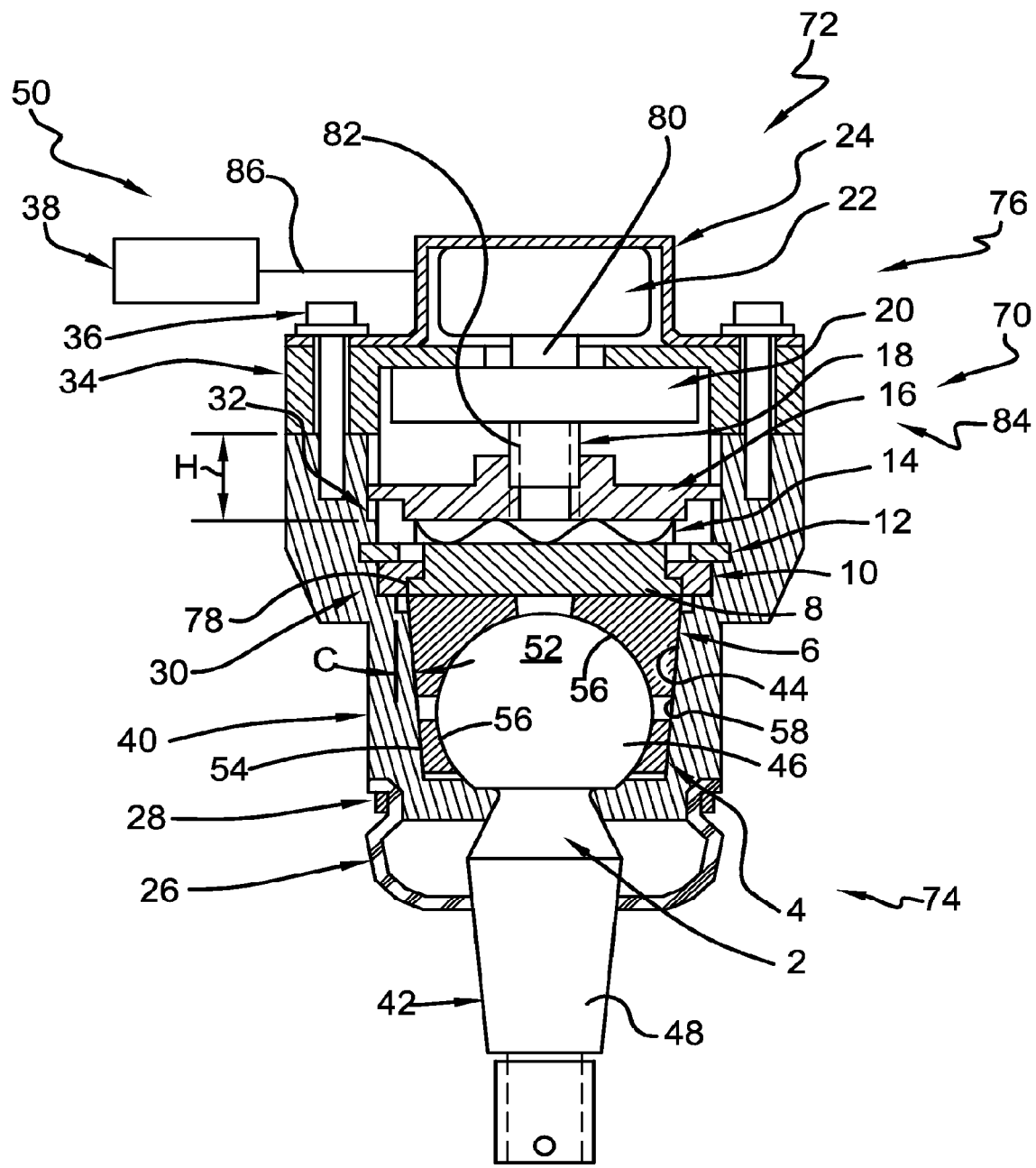
FIG. 3 is a cross-sectional view of a ball joint assembly according to an exemplary embodiment of the invention.

With reference now to FIG. 3, various embodiments of the ball joint assembly 50 will now be described. First, however, it should be noted that the term "ball joint" should be interpreted broadly to include any connection of a ball like portion with a ball like receiving member (sometimes referred to as a "socket") to provide relative rotational movement. The ball joint assembly 50 may include a housing 30 having a cavity 44 that receives a ball stud 2. The housing has a first end 74 proximal to the ball stud 2 and a second end 76 distally spaced from the ball stud 2. The ball stud 2 may include a ball like portion 46 and a shank portion 48. By "ball like portion" it is meant a portion of the ball stud 2 that is shaped substantially like a ball or a sphere as chosen with the sound judgment of a person of skill in the art. The ball like portion 46 may have a hemispherical section 52 distally spaced from the shank portion 48. The shank portion 48 may extend out from the cavity 44, as shown, and may be used to connect to another component as will be discussed further below. A dust boot 26 may be held to the housing 30 with a clip 28 as is well known in the art.

With continuing reference to FIG. 3, the ball joint assembly 50 may include at least one friction seat that receives the ball like portion 46 in rotational engagement. For the embodiment shown, a lower friction seat 4 and an upper friction seat 6, spaced from lower friction seat 4, may be provided. Both of the friction seats 4, 6 may be received within the cavity 44 for relative motion. Specifically, each friction seat 4, 6 may have an outer surface 54 that is juxtaposed to an inner surface 58 of the housing 30. The inner surface 58 may at least partially define the cavity 44, as shown. Each friction seat 4, 6 may also have an inner surface 56 that is contacted by an outer surface of the ball like portion 46 to provide relative rotational movement. In one specific embodiment, shown, an outer surface of the ball like portion 46 on the hemispherical section 52 contacts the inner surface 56 of the upper friction seat 6 and an outer surface of the ball like portion 46 not on the hemispherical section 52 contacts the inner surface 56 of the lower friction seat 4. This use of two friction seats 4, 6 on opposite ends of the ball like portion 46 permits easy transfer and distribution of forces on the upper and lower portions of the ball like portion 46.

With continuing reference to FIG. 3, a friction control mechanism 70 may be used to move the friction seat within the cavity 44 to adjust the friction between the ball like portion 46 and the friction seat. If two friction seats 4, 6 are used, the friction control mechanism 70 may be used to move one or both of the friction seats 4, 6 within the cavity 44 to adjust the friction between the ball like portion 46 and the friction seats 4, 6. The particular friction control mechanism 70 used with this invention can be of any type chosen with the sound judgment of a person of skill in the art. In one embodiment, the friction control mechanism 70 includes a contact member 8 positioned within the housing 30 and a force generating device 72 that applies a force to the contact member 8 to move the contact member 8 into contact with the friction seat 6 to adjust the friction between the ball like portion 46 and the first friction seat 6. The contact member 8 can be any type and shape chosen with the sound judgment of a person of skill in the art. For the embodiment shown, the contact member 8 is disc shaped. A stop member 10 may be used to limit the motion of the contact member 8 toward the second end 76 of the housing 30. The stop member 10 prevents the contact member 8 from moving too far away from the friction seat 6 and thus prevents the ball joint from becoming "loose" in case of other component failure. For the embodiment shown, the stop member 10 is held to the housing 30 with a clip 12. The stop member 10 may include a wedge 78 that is contacted by the contact member 8 to prevent further motion of the contact member 8.

Still referring to FIG. 3, the particular force generating device 72 used with this invention can also be of any type chosen with the sound judgment of a person of skill in the art. The force generating device 72 may include a motor 22 positioned within a motor housing 24. The motor housing 24 may be spaced from the housing 30 or, as with the embodiment shown, the motor housing 24 may be attached to the housing 30, such as with bolts 36, thereby creating a single housing for the ball joint assembly 50. The motor 22 may rotate a motor shaft 80 that is operatively attached to a motion conversion device 84 that converts rotational motion of the motor shaft 80 into linear movement. The linear movement can be then be used to force the contact member 8 to contact the friction seat 6 to adjust the friction between the ball like portion 46 and the friction seat 6. The motion conversion device 84 used with this invention can also be of any type chosen with the sound judgment of a person of skill in the art. For the embodiment shown, the motion conversion device 84 includes a screw drive mechanism that includes a screw 18 having threads on its outer surface that engages threads on a nut 16. Such a screw drive mechanism is relatively easy to make and therefore cost efficient. By operating the motor 22 to rotate the motor shaft 80, the screw 18 is rotated and the nut 16 is moved linearly to apply a force to the contact member 8. At least one slot 32 may be formed on an inner surface of the housing 30, such as by machining, to receive a portion of the nut 16. The slot 32 serves to prevent rotation of the nut 16 (assuring that the nut moves linearly). The slot 32 may also be used to limit the linear motion of the nut 16 toward the first end 74. Specifically, the slot 32 may be designed with a specific depth H, as shown. The depth H limits the maximum stroke for the nut 16. In this way the maximum force put on the ball stud 2 and the maximum friction torque applied is constrained. This prevents "lock-up" of the ball joint that could otherwise occur due to excessive friction if, for example, the motor 22 or another component fails.

Figure 4:
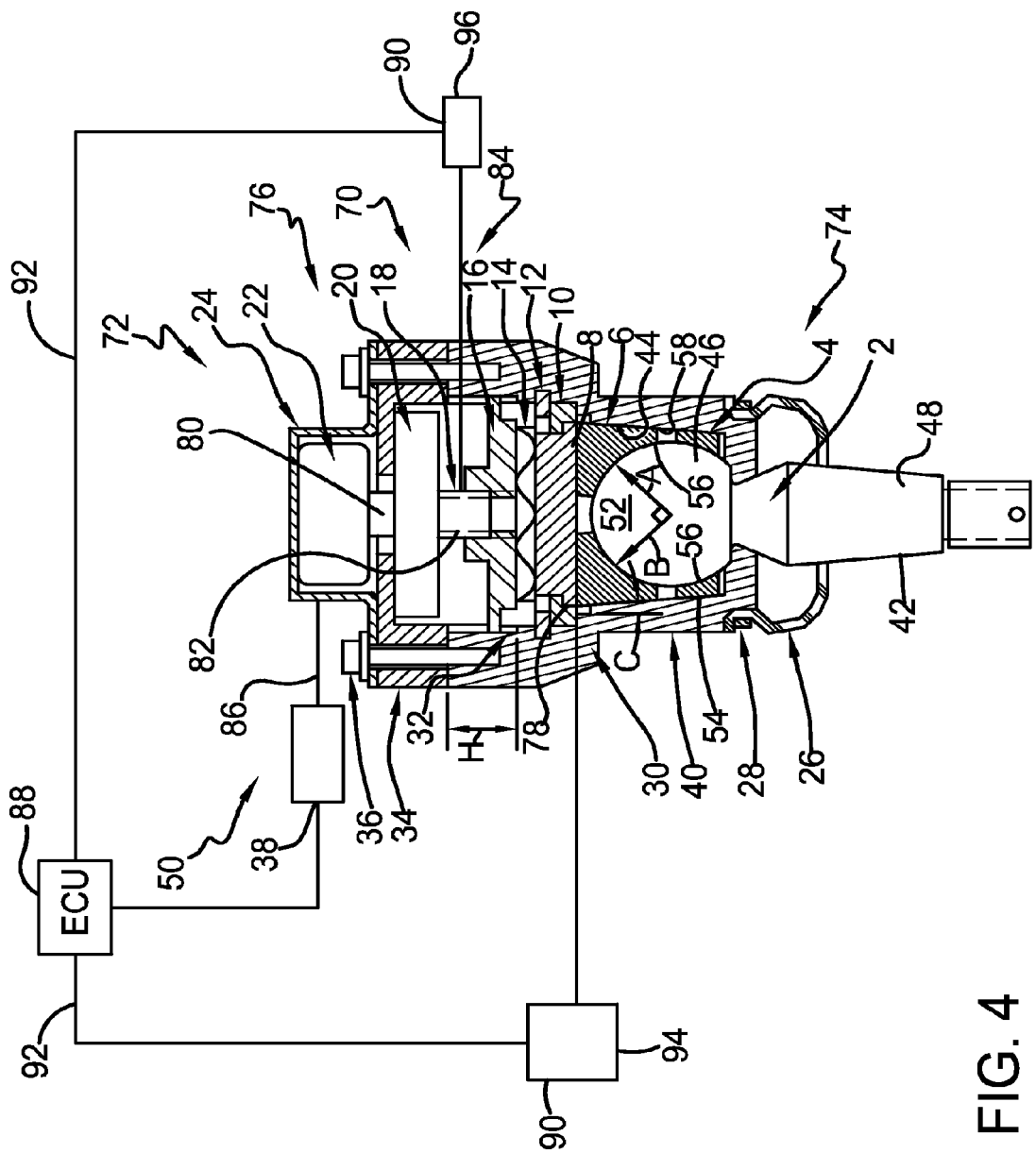
FIG. 4 is a cross-sectional view of a ball joint assembly similar to that shown in FIG. 3 but showing additional possible control components.

Depending on the particular rotation speeds generated by the motor 22 and the particular rotation speeds required for the screw 18, the force generating device 72 may also include a reduction gear mechanism 20 to reduce the rotational speed applied to the screw 18. The reduction gear mechanism 20 may include a gear housing 34 and an output shaft 82. The gear housing 34 may be spaced from the housing 30 or, as with the embodiment shown, the gear housing 34 may be attached to the housing 30 (along with the motor housing 24), such as with bolts 36, thereby creating a single housing for the ball joint assembly 50. The reduction gear mechanism 20 receives the motor shaft 80 as an input at a rotational velocity and as an output provides the output shaft 82 with a rotational velocity that is substantially less than the rotational velocity of the motor shaft 80. The screw 18 may be fixedly attached to the output shaft 82. As the operation of a reduction gear mechanism is known to those of skill in the art, further details will not be provided here. In one embodiment it may be desirable to provide a biasing device 14, such as a spring, to dampen the force applied to the contact member 8 by the force generating device 72. The biasing device 14 thus reduces any possible backlash and any abrupt impact during operation of the ball joint assembly 50. The biasing device 14 may be positioned at any location within the housing 30 chosen with the sound judgment of a person of skill in the art. For the embodiment shown, the biasing device 14 is positioned between the nut 16 and the contact member 8. FIGS. 3 and 4 show the contact member 8 as a solid structure and therefore the biasing device 14 is operable to macroscopically deform in response to the force generated by the force generating 72 device prior to macroscopic deformation of the contact member 8.

With reference now to FIGS. 3-4, in one embodiment a controller 38 may be used to operate the ball joint assembly 50 to control the friction levels. The controller 38 may be of any type chosen with the sound judgment of a person of skill in the art to provide a signal 86. If more than one ball joint assembly 50 is used, each may have its own controller 38. In another embodiment, multiple ball joint assemblies 50 may be controlled with a single controller 38. In one embodiment, the controller 38 may provide a mechanical signal 86—such as a pneumatic or hydraulic pressure. In another embodiment, the controller 38 may provide an electrical signal 86. Since the operation of controllers, including mechanical and electrical signals, is well known to those of skill in the art, further details will not be provided here. The controller 38 may be a standalone unit. In other embodiments, it may be integrated with one or more other control units. If the ball joint assembly 50 is used with the chassis system 150 of a vehicle 100, for example, the controller 38 may be integrated with the vehicle's electronic control unit (ECU) 88. In this case, the friction level in the ball joint assembly 50 may be adjusted in response to various driving conditions and operating parameters of the vehicle 100.

With reference now to FIG. 4, one or more sensors 90 may be used to sense an operating condition and may then send a corresponding feedback signal 92 to the controller 38 and/or to the ECU 88. Each sensor 90 may provide a mechanical or an electrical feedback signal 92 appropriate for the controller 38 and/or the ECU 88. In one embodiment, the sensor 90 is a load sensor 94 that senses the force applied to the friction seat. In another embodiment, the sensor 90 is a rotation sensor 96 that senses the rotation of the screw 18 and thus the displacement of the nut 16. It should be noted that load and rotation sensors 94, 96 are exemplary only as any number and type of sensor chosen with the sound judgment of a person of skill in the art will work with this invention. Since the operation of sensors is well known to those of skill in the art, further details will not be provided here.

Figure 5:
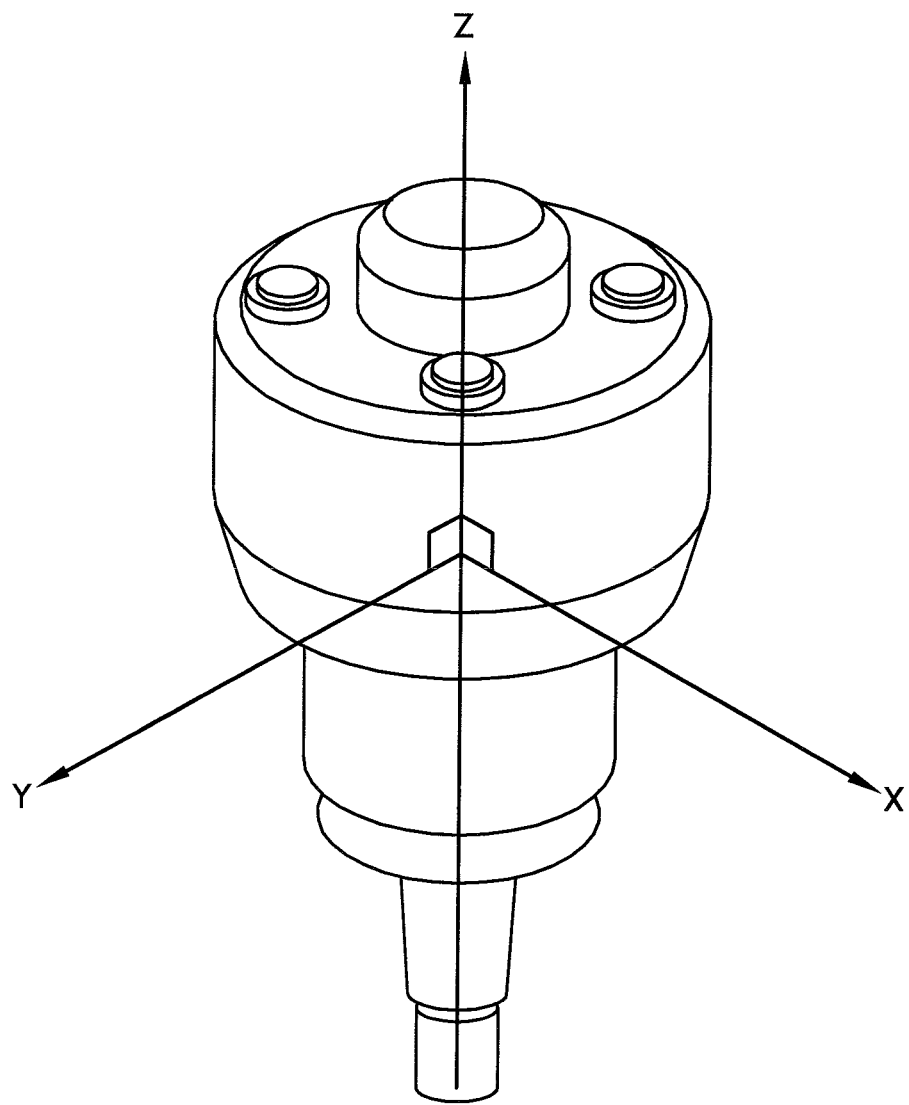
FIG. 5 is a schematic view of a ball joint assembly positioned in an X-Y-Z coordinate system.

With reference now to FIGS. 3-5, in one embodiment of this invention, the friction between the ball like portion 46 and the friction seat 6 can be adjusted in both a first direction and a second direction that is offset 90 degrees from the first direction. Thus, for an example shown in FIG. 4, the friction can be adjusted in both radial direction A (with respect to the ball like portion 46) and radial direction B. For another example, shown in FIG. 5, the friction can be adjusted in both axial direction Z (with respect to the ball joint assembly 50) and radial directions X and/or Y (with respect to the ball like portion 46). In one specific embodiment, this offset adjustment of friction may be accomplished simultaneously in both directions. While the adjustment of friction in an offset 90 degrees may be achieved in any manner chosen with the sound judgment of a person of skill in the art, for the embodiment shown it is achieved using a frustoconical shape. Specifically, the cavity 44 may have a frustoconical shape, at an angle C with respect to the housing 30 as shown, and the friction seat 6 may have a corresponding frustoconical shape at a similar angle. With this frustoconical shape, when a force is applied by the contact member 8 to the friction seat 6, the contact normal forces between the friction seat 6 and the hemispherical section 52 of the ball like portion 46 are controlled at the 90 degree offset described above. The ratio of the resultant friction torques in the offset directions can be determined based on the angle C and the material property of the friction seat 6. Note that the friction seat 4 may also have a frustoconical shape that is received within the frustoconical shape of the cavity 44. In this way, the friction seat 4 is also able to apply offset forces to the ball like portion 46—not just normal forces in one direction as is known in the prior art.

Figure 6:
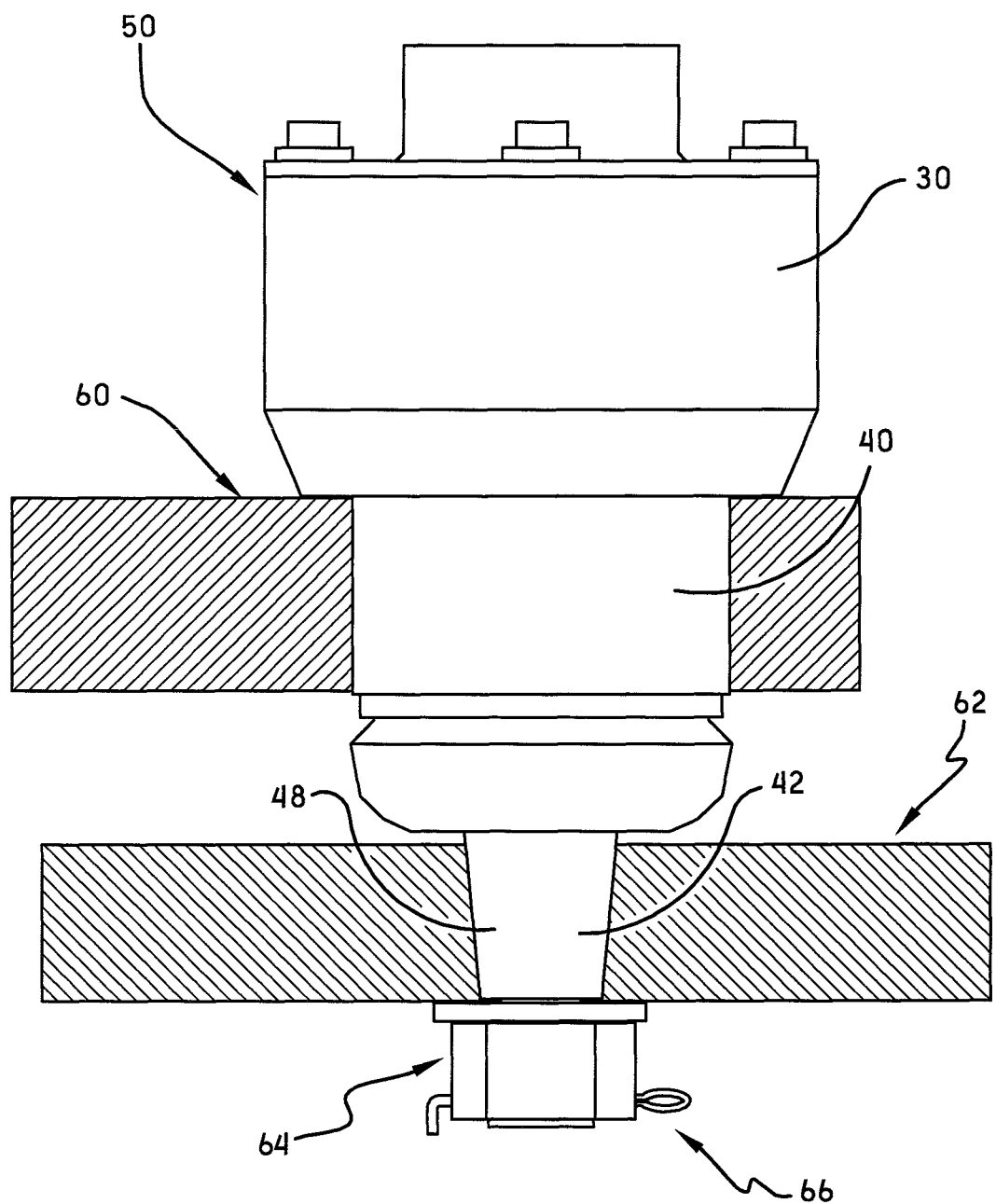
FIG. 6 is a schematic view of a ball joint assembly connected to two mechanical parts.
Figure 7:
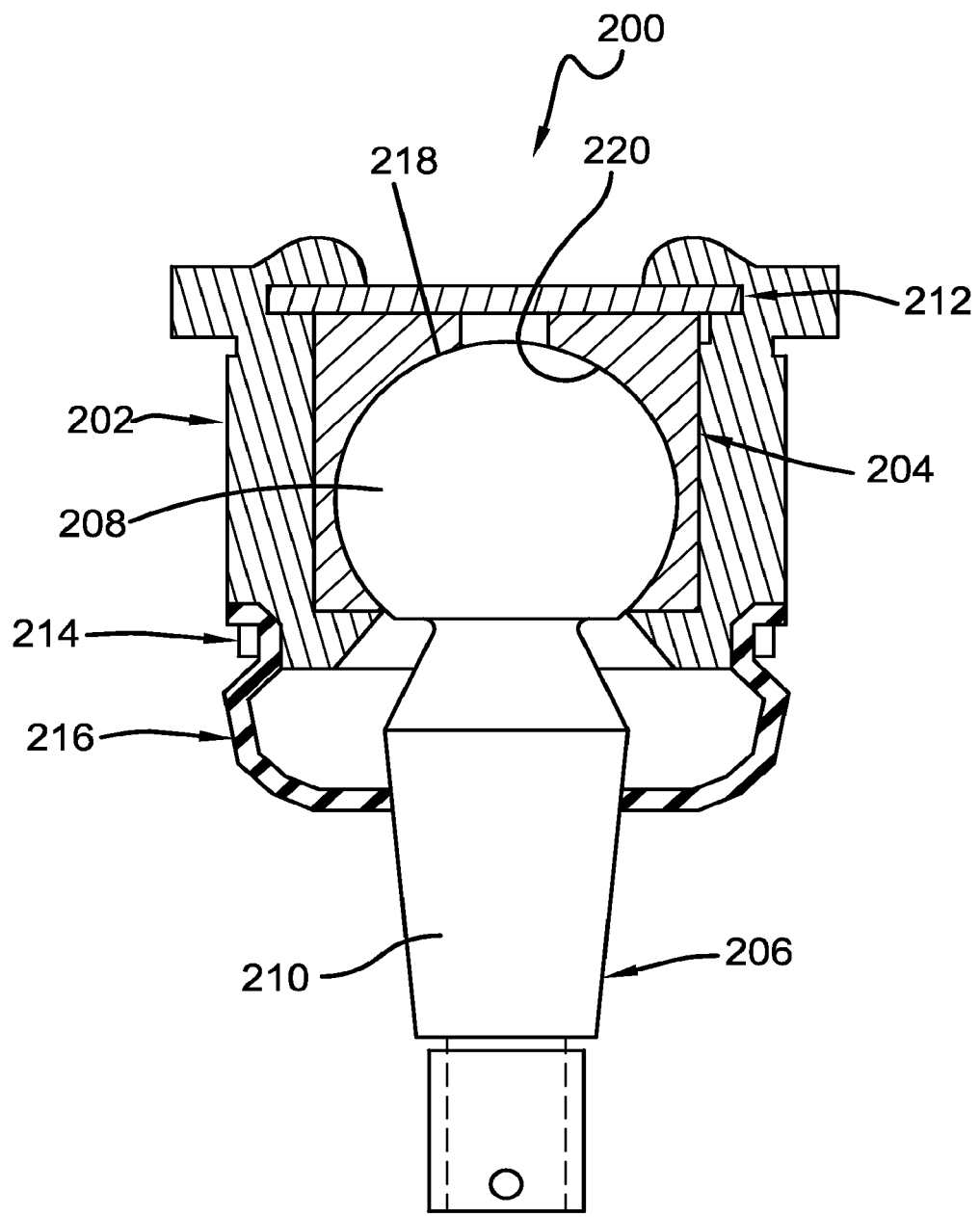
FIG. 7 is a cross-sectional view of a conventional ball joint assembly.

FIG. 6 provides a generic example of how the ball joint assembly 50 may be used to connect two mechanical parts, 60 and 62. The mechanical part 60 may be pressed to fit onto the cylindrical portion 40 of the housing 30. The mechanical part 62 may be fitted onto the tapered portion 42 of the shank 48. A nut 64 may be used to lock the mechanical part 62 in position and a wire pin 66 may then be used to prevent the nut 64 from coming loose.

With reference now to FIGS. 3-6, the materials used to make the components of the ball joint assembly 50 and the specific types of components used can be any chosen with the sound judgment of a person of skill in the art. The friction seats 4, 6, for some non-limiting examples, may be formed of plastic, Teflon, bronze and/or brass. The motor 22 may be a brushed direct current (DC) motor, a brushless DC motor, or a stepper motor. The reduction gear mechanism 20 may be a harmonic drive, may use planetary gears, a worm-wheel, and/or spur gears.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:

1. A ball joint assembly comprising:
   a housing having a cavity that is at least partially defined by a first inner surface;
   a friction seat that: (1) is at least partially received within the cavity; and, (2) has: (a) an outer surface juxtaposed to the first inner surface of the housing; and, (b) an inner surface;
   a ball stud having: (1) a ball like portion that: (a) is movable within the cavity; and, (b) has a first outer surface that contacts the inner surface of the friction seat; and, (2) a shank portion that extends out from the cavity;
   a friction control mechanism comprising: (1) a contact member positioned within the housing; (2) a controller that provides at least one of a mechanical and an electrical signal; (3) a motor that rotates a motor shaft in response to the signal from the controller; and, (4) a motion conversion device that converts rotational motion of the motor shaft into linear movement of the contact member to contact the friction seat to adjust the friction between the ball like portion and the friction seat;

wherein the housing has:
a first end proximal to the ball stud, a second end distally spaced from the ball stud, and a longitudinal axis extending between the first and second ends; and
at least one slot;

wherein the motion conversion device comprises:
a screw that: (1) is positioned within the housing; (2) is rotatable by the motor shaft; and, (3) has threads on an outer surface; and
a nut that: (1) is positioned within the housing; (2) has threads that rotatably engage the threads on the screw; and, (3) moves linearly along the longitudinal axis into contact with the contact member to force the contact member to contact the friction seat; and wherein the at least one slot: receives a portion of the nut, prevents rotation of the nut; and, limits the linear motion of the nut toward the first end of the housing.

2. A ball joint assembly comprising:
a housing defining a cavity, the housing having a first end, an opposite second end, and a longitudinal axis extending between the first and second ends;
a friction seat disposed within the cavity and having an inner surface and an outer surface;
a ball stud including a ball portion disposed within the cavity and a shank portion, the ball portion having an outer surface contacting the inner surface of the friction seat, the shank portion extending from the housing at the first end of the housing;
a contact member contacting the friction seat;
a biasing member contacting the contact member;
a nut member contacting the biasing member to apply a force to the biasing member that is transmitted to the contact member, which in turn transmits a subsequent force to each of the friction seat and the ball portion of the ball stud, the nut member engaging the housing such that rotation of the nut member with respect to the housing is substantially prevented while translation of the nut member along the longitudinal axis of the housing is permitted, the translation of the nut member varying the force applied by the nut member;
an electric motor adjacent the second end of the housing having a rotatably driven output shaft;
a screw operatively coupled to the output shaft of the electric motor such that rotation of the output shaft rotates the screw, the screw threadedly engaging the nut member such that rotation of the screw translates the nut member along the longitudinal axis of the housing;
a controller generating an electrical signal directed to the electric motor for translating the nut member along the longitudinal axis of the housing to vary the force applied by the nut member so as to control a friction level between the friction seat and the ball stud.

3. The ball joint assembly according to claim 2, wherein the housing includes at least one slot receiving a peripheral portion of the nut member, the slot having a depth such that the translation of the nut member with respect to the housing is limited.

4. The ball joint assembly according to 3, wherein the housing includes first and second slots on opposite sides of the housing.

5. The ball joint assembly according to claim 2 further comprising a sensor monitoring an operating condition of the ball joint and generating a feedback signal to the controller.

6. The ball joint assembly according to claim 4, wherein the sensor is a load sensor sensing force applied to the friction seat.

7. The ball joint assembly according to claim 4, wherein the sensor is a rotation sensor sensing rotation of the screw.

8. The ball joint assembly according to claim 2 further comprising a gear mechanism connecting the output shaft of the electric motor to the screw.

9. The ball joint assembly according to claim 2, wherein the housing and the shank portion of the ball stud are respectively connected to first and second chassis components of a vehicle, and wherein the friction level between the friction seat and the ball stud is controllably varied by the controller in response to a varying vehicle condition.

10. The ball joint assembly according to claim 9 further comprising an electronic control unit of the vehicle connected to the controller.

* * * * *